April 24, 1945. T. GALLO 2,374,189
DILUTER FOR MOTOR CRANK CASE LUBRICANT
Filed Aug. 11, 1942 2 Sheets-Sheet 1
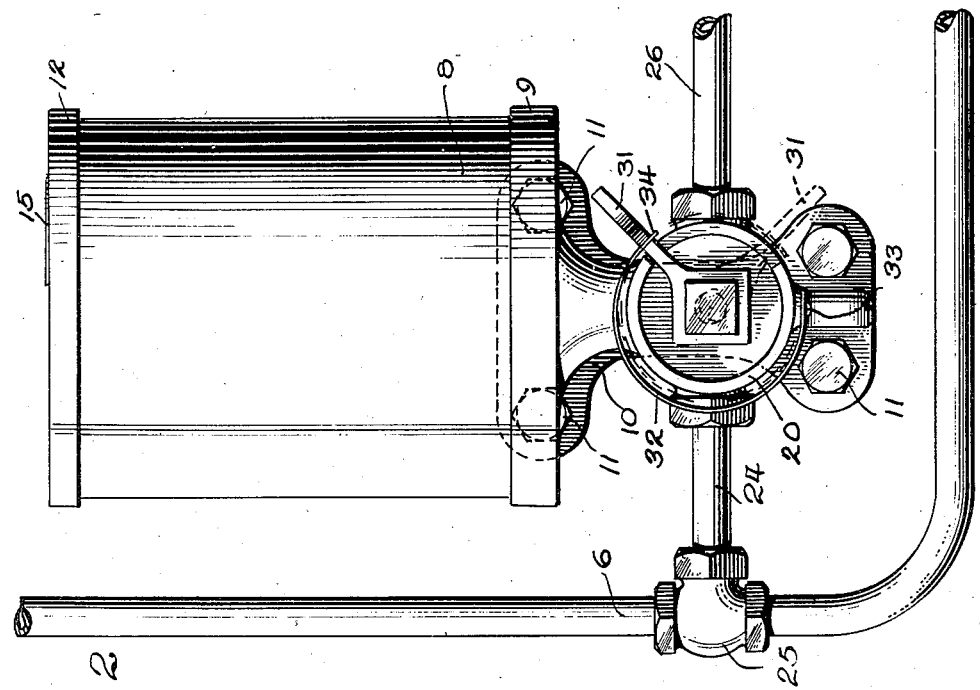
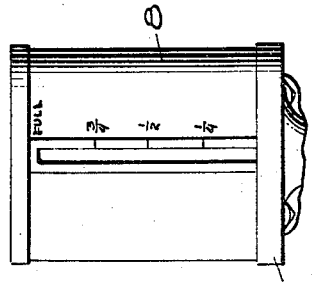
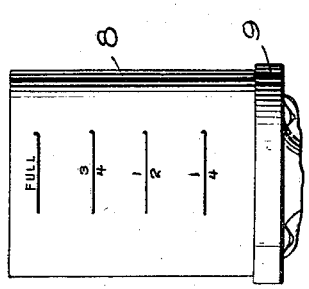
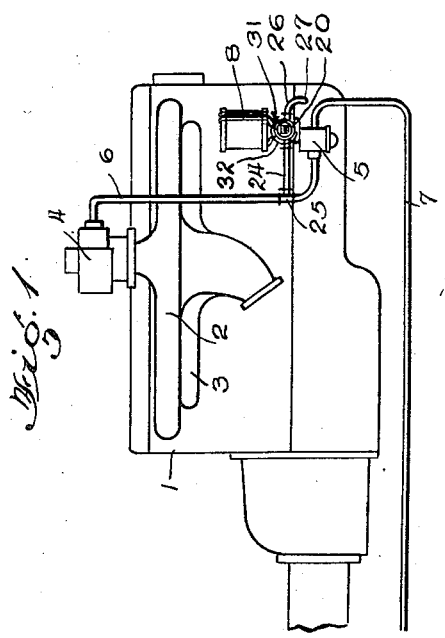
INVENTOR.
Thomas Gallo
BY
Wm F Doyle
ATTORNEY

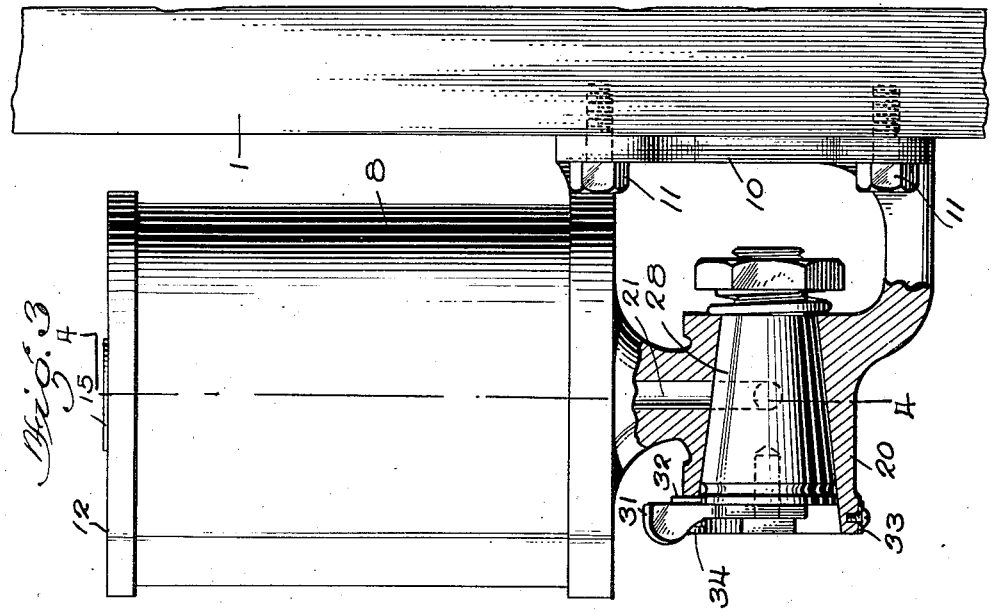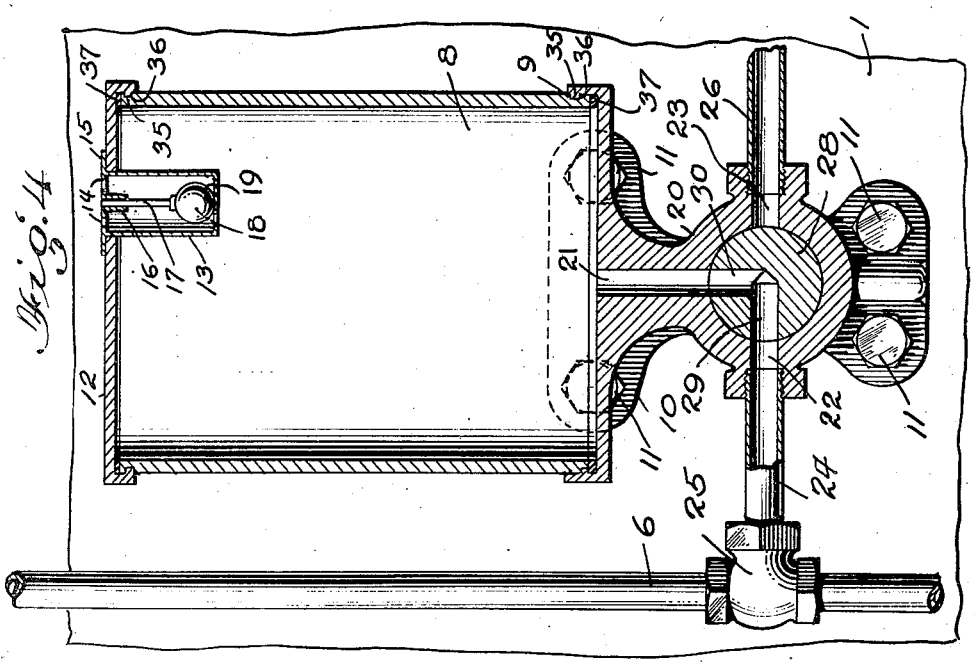

Patented Apr. 24, 1945

2,374,189

UNITED STATES PATENT OFFICE 2,374,189

DILUTER FOR MOTOR CRANKCASE LUBRICANT

Thomas Gallo, Arlington, Va.

Application August 11, 1942, Serial No. 454,376

2 Claims. (Cl. 123—196)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to diluters for lubricants and more particularly to means whereby the lubricating oil in the crank case of a motor may be diluted with gasoline from the usual supply to the motor to enable greater freedom of operation of the parts of the motor in starting in cold weather or under other conditions wherein the viscosity of the lubricant in the crank case should be diminished due to low temperature.

A specific use of the device herein, is when for instance a motor vehicle is to be left unoperated over a period of time in a cold climate, means are here provided whereby a predetermined amount of gasoline may be drawn from the fuel tank and discharged into the lubricant in the crank case of the motor for the purpose of diluting the lubricant, reducing its viscosity, and its tendency to congeal, to such an extent that starting of the motor is made very difficult, the drain on the battery is very severe, and at times the battery is unable to turn over the motor at all or only at such a slow speed that the motor will not start. It is for the purpose of thinning the lubricant in the crank case of the motor with gasoline to diminish its resistance to the operation of the crank members of the motor in the crank case, the oil pump, and the release and free and easy movement of the various lubricated parts of the motor supplied from the crank case, that this invention is intended.

While a preferred form of device is herein shown and described, it will be understood that slight changes in form and minor details of construction may be resorted to without departing from the spirit of the invention, or fall beyond the scope of the claims.

Similar numerals indicate corresponding parts in all the figures of the drawings, in which:

Fig. 1 is a side view showing diagrammatically the improved means for diluting the lubricating oil in the crank case of a motor.

Fig. 2 is an enlarged view of the diluting attachment for motor crank case lubricating oil.

Fig. 3 is a side view partly in section of Fig. 2.

Fig. 4 is a vertical sectional view on line 4—4 of Fig. 3.

Figs. 5 and 6 are elevations reduced in size of modified forms of container body portions, having graduations thereon, indicating levels for various quantities of gasoline that may be deposited in the containers when desired.

Reference now being had to the drawings by numerals, 1 indicates an internal combustion motor, 2 its intake manifold, 3 the exhaust manifold, 4 the carburetor, 5 the fuel pump, 6 the fuel line between the pump and the carburetor 4, 7 the fuel line from the fuel tank (not shown), to the pump 5, all of which form no part of the present invention.

Mounted on the motor in any preferred position is a container 8 of any preferred form or material, that may be seated and sealed at its base in the valve casing at 9, the valve casing having a mounting bracket 10 forming an integral part with or secured in any preferred manner to said valve and adapted to be secured by bolts 11 to the motor.

The container 8 is provided with a cover 12 properly secured in place and having removably mounted therein a tube 13 provided in its top with breather openings 14, and a flange 15, adapted to be secured in an opening in the cover. The breather tube is provided at its upper end with a depending sleeve 16 in which the shank 17 of a float 18 operates and projects above the top of the container when full and when empty the float rests on the bottom 19 of tube 13 with the upper end of the shank beneath the top of the container. The shank 17 when it rises above its lower position of rest, indicates the container 8 is full. Said container may be constructed of glass or any other suitable substance and may be threaded or secured by lugs 35 and slanted slots 36, with gaskets 37 between the parts.

The body portion of the valve casing 20 is provided with a vertical, or receptacle filling port 21 in communication with the interior of the receptacle, a horizontal intake or filler port 22 and an outlet or drain port 23.

Connected with the intake or filler port 22 is an intake or filler tube 24 connected through T 25 with the fuel line tube 6, between the pump 5 and the carburetor 4. Connected with the outlet or drain port 23 is a drain tube 26 connected at its discharge end with the interior of the crank case of the motor at 27.

The rotor of the valve 28 is provided with radially arranged ports 29 and 30 at 90 degrees in communication at the center of rotation of the valve rotor in line with ports 21—22—23 in the valve casing adapted, in different positions of the rotor of the valve to open a passage from the intake or filler tube 24, through the valve to the receptacle 8 as shown in Fig. 4 of the drawings, or when rotated in a clockwise direction through an arc of 90 degrees to form a passage from the receptacle 8 through drain tube 26 to the crank case of the motor, and close the intake or filler passages.

A valve operating lever 31 is mounted on the valve rotor or stem 28 and a leaf spring 32, mounted at 33 at its lower end on the valve casing, extends around the outer end of the valve rotor and is connected at its free end to the valve operating lever, at 34, in such a manner as to permit the anti-clockwise movement of the lever from its lower position against the tension of the spring which will bulge out as shown in Fig. 2 and when the lever is released the spring will rotate the lever to its lower position, cut off the flow of gasoline from the fuel tank to the container and at the same time permit the gasoline in the container to drain into the crank case. The valve lever 31 is operated manually into its upper position against the tension of the spring 32 and brings into communication through the valve, the flow of fuel through filler tube 24 to the receptacle 8.

The operation of the device is as follows: When the motor is to be left not running for any length of time where the temperature is low, the operator, prior to cutting off the motor, operates valve control lever 31 up from its normal position, against the tension of spring 32 to the position of the valve that will permit flow of fuel through T 25 and the tube 24 and the valve, up into receptacle 8. When receptacle 8 is filled, float 18 will cause its stem 17 to rise and indicate to the operator that the receptacle is full and he then releases the lever which automatically, under the influence of spring 32, is forced into its lower position, thereby cutting off the flow of fuel up into the receptacle and by the same movement of the valve, opening communications from the receptacle down through the valve out through drain tube 26, to the crank case.

The entire capacity of the container usually will be the proper amount of diluent required, but if an occasion arises in which various quantities of the diluent less than the entire capacity of the container is desired, the body of the container may be formed of glass having graduations thereon, as shown in Fig. 5 or as shown in Fig. 6, one of the other opaque plastic materials with a window through which the level of gasoline within the container may be seen.

After the motor has run long enough to force the lubricant into all the bearings supplied from the crank case, the motor is cut off, and it stands with its parts all lubricated with a thin solution for easy start.

Having fully described my invention, what I claim and desire to secure by Letters Patent is:

1. In combination with an internal combustion engine having a crank case adapted to contain lubricating oil, a carburetor, a fuel pump and a fuel supply line through the pump to said carburetor, a means adapted to dilute the lubricant in said crank case comprising a container of predetermined capacity for fluid disposed above the lubricant in said crank case for gravity flow of fluid to said crank case, a float indicator in the upper portion of said container, a two-way valve disposed below said container and connected therewith, fuel conveyor tubes connecting said valve with the fuel supply line and with the crank case of the engine, said valve being adapted to direct fuel from the fuel supply line to the container or from the container to the crank case of the engine, and spring means for normally urging said valve to a position to direct fuel from said container to the crank case of said engine while simultaneously obstructing flow of fuel from the fuel supply line to the container.

2. In combination with an internal combustion engine having a crank case adapted to contain lubricating oil, means adapted to dilute the lubricant in said crank case comprising a diluent source for the lubricating oil in said crank case, a container of predetermined capacity, for fluid, disposed above the lubricant in said crank case for gravity flow of fluid to said crank case, a float indicator in the upper portion of said container, a two-way valve disposed below said container, diluent conveyor tubes connecting said valve with the diluent source and with the crank case of the engine, said valve being adapted to direct diluent from the diluent source to the container or from the container to the crank case of the engine, and spring means for normally urging said valve to a position to direct diluent from said container to the crank case of said engine while simultaneously obstructing flow of diluent from the diluent source to the container.

THOMAS GALLO.